(12) United States Patent
Michini et al.

(10) Patent No.: US 11,242,143 B2
(45) Date of Patent: Feb. 8, 2022

(54) UNMANNED AERIAL VEHICLE BEYOND VISUAL LINE OF SIGHT CONTROL

(71) Applicant: Skydio, Inc., Redwood, CA (US)

(72) Inventors: Bernard J. Michini, San Francisco, CA (US); Logan Kaminski, San Francisco, CA (US); Edward Dale Steakley, Cupertino, CA (US)

(73) Assignee: Skydio, Inc., Redwood City, CA (US)

( * ) Notice: Subject to any disclaimer, the term of this patent is extended or adjusted under 35 U.S.C. 154(b) by 0 days.

(21) Appl. No.: 15/617,924

(22) Filed: Jun. 8, 2017

(65) Prior Publication Data

US 2017/0357273 A1    Dec. 14, 2017

Related U.S. Application Data

(60) Provisional application No. 62/349,590, filed on Jun. 13, 2016.

(51) Int. Cl.
*B64C 39/02* (2006.01)
*G05D 1/10* (2006.01)
(Continued)

(52) U.S. Cl.
CPC ......... *B64C 39/024* (2013.01); *G05D 1/0022* (2013.01); *G05D 1/0033* (2013.01);
(Continued)

(58) Field of Classification Search
None
See application file for complete search history.

(56) References Cited

U.S. PATENT DOCUMENTS 6,509,926 B1  1/2003  Mills et al.
7,460,148 B1  12/2008 Clark et al.
(Continued)

FOREIGN PATENT DOCUMENTS

WO   WO 2015/102731   7/2015
WO   WO 2015/126422   8/2015

OTHER PUBLICATIONS

International Search Report and Written Opinion of the International Searching Authority for PCT Application No. PCT/US2017/016860, dated May 30, 2017, 14 pages.
(Continued)

*Primary Examiner* — Todd Melton
*Assistant Examiner* — Jason R Roberson
(74) *Attorney, Agent, or Firm* — Young Basile Hanlon & MacFarlane, P.C.

(57) ABSTRACT

Methods, systems and apparatus, including computer programs encoded on computer storage media for unmanned aerial vehicle beyond visual line of sight (BVLOS) flight operations. In an embodiment, a flight planning system of an unmanned aerial vehicle (UAV) can identify handoff zones along a UAV flight corridor for transferring control of the UAV between ground control stations. The start of the handoff zones can be determined prior to a flight or while the UAV is in flight. For handoff zones determined prior to flight, the flight planning system can identify suitable locations to place a ground control station (GCS). The handoff zone can be based on a threshold visual line of sight range between a controlling GCS and the UAV. For determining handoff zones while in flight, the UAV can monitor RF signals from each GCS participating in the handoff to determine the start of a handoff period.

30 Claims, 9 Drawing Sheets

(51) Int. Cl.
*G05D 1/00* (2006.01)
*G05D 1/04* (2006.01)

(52) U.S. Cl.
CPC ........ *G05D 1/106* (2019.05); *B64C 2201/104* (2013.01); *B64C 2201/108* (2013.01); *B64C 2201/127* (2013.01); *B64C 2201/141* (2013.01)

(56) References Cited

U.S. PATENT DOCUMENTS

| | | | |
|---|---|---|---|
| 8,721,197 B2 | 5/2014 | Miyahara et al. | |
| 9,127,908 B2 | 9/2015 | Miralles | |
| 9,273,981 B1 | 3/2016 | Downey | |
| 9,412,278 B1 | 8/2016 | Gong | |
| 9,563,201 B1 | 2/2017 | Tofte et al. | |
| 9,588,516 B1 | 3/2017 | Gurel et al. | |
| 9,618,940 B1 | 4/2017 | Michini | |
| 2004/0174434 A1 | 9/2004 | Walker et al. | |
| 2004/0249519 A1 | 12/2004 | Frink | |
| 2006/0148418 A1 | 7/2006 | Purkayastha et al. | |
| 2008/0033604 A1 | 2/2008 | Margolin | |
| 2008/0094491 A1 | 4/2008 | Hsu et al. | |
| 2009/0041295 A1 | 2/2009 | Matsuzaka et al. | |
| 2009/0044117 A1 | 2/2009 | Voughan et al. | |
| 2009/0125223 A1 | 5/2009 | Higgins | |
| 2009/0248287 A1 | 10/2009 | Limbaugh et al. | |
| 2010/0087980 A1* | 4/2010 | Spura | G05D 1/0022 701/24 |
| 2010/0198514 A1 | 8/2010 | Miralles | |
| 2010/0231731 A1 | 9/2010 | Motomura et al. | |
| 2011/0147515 A1 | 6/2011 | Miller | |
| 2012/0176494 A1 | 7/2012 | Kamon et al. | |
| 2012/0237028 A1 | 9/2012 | Khazan et al. | |
| 2013/0070092 A1 | 3/2013 | Miyahara et al. | |
| 2013/0311009 A1 | 11/2013 | McAndrew et al. | |
| 2014/0140575 A1 | 5/2014 | Wolf et al. | |
| 2014/0142787 A1 | 5/2014 | Tillotson et al. | |
| 2014/0316614 A1 | 10/2014 | Newman | |
| 2014/0371952 A1 | 12/2014 | Ohtomo | |
| 2015/0062339 A1 | 3/2015 | Ostrom | |
| 2015/0142211 A1 | 5/2015 | Shehata et al. | |
| 2015/0230150 A1 | 8/2015 | Wang | |
| 2015/0323930 A1 | 11/2015 | Downey | |
| 2016/0025457 A1 | 1/2016 | Miralles | |
| 2016/0035224 A1* | 2/2016 | Yang | H04B 7/18506 701/23 |
| 2016/0068267 A1 | 3/2016 | Liu | |
| 2016/0161258 A1* | 6/2016 | Magson | G01C 21/00 701/467 |
| 2016/0163204 A1* | 6/2016 | Raptopoulos | G08G 5/0069 701/3 |
| 2016/0224766 A1 | 8/2016 | Steelberg et al. | |
| 2016/0227259 A1 | 8/2016 | Brav | |
| 2016/0307447 A1 | 10/2016 | Johnson et al. | |
| 2016/0328983 A1* | 11/2016 | Hutchinson | G08G 5/045 |
| 2016/0330771 A1* | 11/2016 | Tan | H04W 72/08 |
| 2016/0332739 A1 | 11/2016 | Wong et al. | |
| 2016/0335476 A1 | 11/2016 | Renkis | |
| 2016/0358432 A1 | 12/2016 | Branscomb et al. | |
| 2016/0364579 A1 | 12/2016 | Wilmes | |
| 2016/0373699 A1 | 12/2016 | Torres et al. | |
| 2017/0083979 A1 | 3/2017 | Winn et al. | |
| 2017/0084037 A1 | 3/2017 | Barajas Hernandez et al. | |
| 2017/0148328 A1 | 5/2017 | Chan et al. | |
| 2017/0169713 A1 | 6/2017 | Gong et al. | |
| 2017/0192424 A1 | 7/2017 | Poole | |
| 2017/0229022 A1 | 8/2017 | Gurel et al. | |
| 2017/0235018 A1 | 8/2017 | Foster et al. | |
| 2017/0269590 A1* | 9/2017 | Feng | B64C 39/024 |
| 2017/0293301 A1 | 10/2017 | Myslinski | |
| 2017/0372514 A1 | 12/2017 | Grufman et al. | |
| 2018/0025473 A1 | 1/2018 | Contreras et al. | |
| 2018/0025649 A1 | 1/2018 | Contreras et al. | |
| 2018/0139074 A1* | 5/2018 | Hong | H04W 36/28 |

OTHER PUBLICATIONS

International Search Report and Written Opinion in International Application No. PCT/US2017/018863, dated May 24, 2017, 10 pages.

* cited by examiner

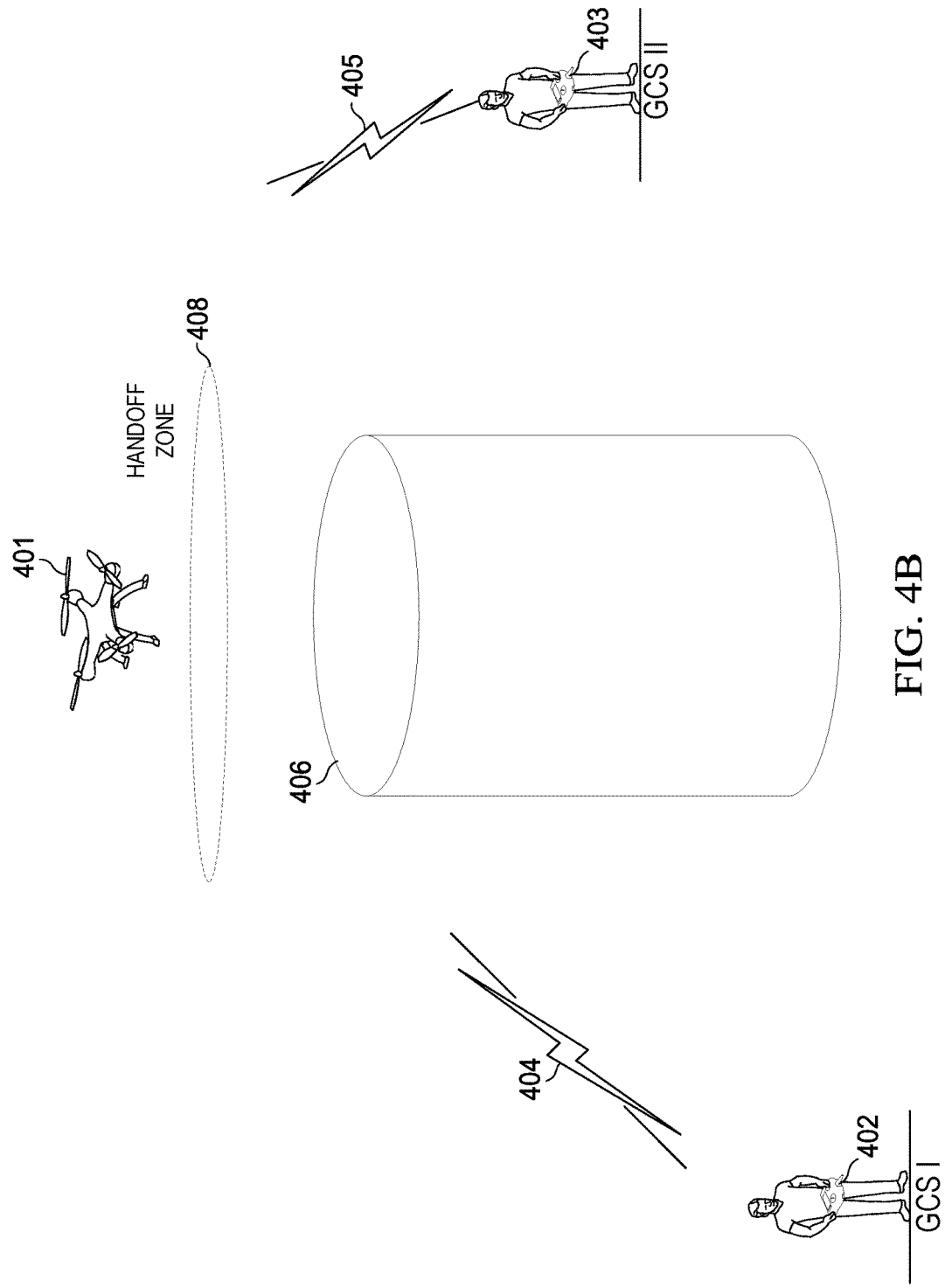

UNMANNED AERIAL VEHICLE BEYOND VISUAL LINE OF SIGHT CONTROL

CROSS-REFERENCE TO RELATED APPLICATION

This application claims priority to U.S. Provisional Application No. 62/349,590, entitled "Unmanned Aerial Vehicle Beyond Visual Line of Sight Control," filed Jun. 13, 2016, the entire contents of which are incorporated herein by reference.

BACKGROUND

Many unmanned aerial vehicles are manually flown or flown via an autopilot in visual flight conditions. As unmanned aerial vehicle (UAV, also referred to as a drone) operations become more prevalent, UAVs may increasingly fly around areas including natural or man-made structures under visual flight rules. Various environmental conditions or inspection needs may cause or require the UAV to fly beyond visual line of sight (BVLOS) of the operator, or beyond radio communication distance of a ground control station.

SUMMARY

Particular embodiments of the subject matter described in this specification can be implemented so as to realize one or more of the of the following advantages. In general, one innovative aspect of the subject matter described in this specification can be embodied in systems, methods and computer-readable storage mediums that include the actions of establishing, by a UAV, a first radio frequency (RF) communication link with a first ground control station; navigating the UAV under the control of the first ground control station; establishing, by the UAV, a handoff period for transferring control of the UAV from the first ground control station to a second ground control station; determining, by the UAV, that a second RF communication link is established with the second ground control station; during the handoff period, initiating, by the UAV, transfer of control of the UAV from the first ground control station to the second ground control station; and after transferring control of the UAV from the first ground control station to the second ground control station, navigating the UAV under the control of the second ground control.

In general, another innovative aspect of the subject matter described in this specification can be embodied in methods that include the actions of receiving, by an unmanned aerial vehicle (UAV), updates to a flight plan for the UAV from a first ground control station; synchronizing the updates with a flight plan stored on the UAV to generate an updated flight plan; receiving, by the UAV, a request from a second ground control station to control the UAV; authenticating, by the UAV, the second ground control station; and sending, by the UAV, the updated flight plan to the second ground control station.

In general, another innovative aspect of the subject matter described in this specification can be embodied in methods that include the actions of receiving, by an unmanned aerial vehicle (UAV), radio frequency (RF) signals from first and second ground control stations; predicting, by the UAV, times when the first and second ground control stations will lose or obtain visual line of sight with the UAV based at least in part on the RF signals; and determining, by the UAV, a handoff period for transferring control of the UAV between the first and second ground control stations.

In general, another innovative aspect of the subject matter described in this specification can be embodied in methods that include the actions of simulating, by a flight planning computer, a flight path of an unmanned aerial vehicle (UAV) according to a flight plan; determining, based on the simulated flight path, if the UAV is beyond visual line of sight of a ground control station; altering the flight path or location of the ground control station if the UAV is not in visual line of sight of the ground control station at any time during the mission; and determining if the altered flight path or location of the ground control station violates a constraint in the flight plan.

In general, another innovative aspect of the subject matter described in this specification can be embodied in methods that include the actions of establishing, by an unmanned aerial vehicle (UAV), a first radio frequency (RF) communication link with a first ground control station (GCS) for controlling the UAV, the first GCS having operative control over the UAV; receiving, by the UAV, a flight plan to be conducted via an auto-pilot mode by the UAV; navigating the UAV according to the flight plan received from the first GCS; establishing, by the UAV, a second RF communication link with a second GCS; determining by the UAV whether to transfer operative control from the first GCS to the second GCS; and if determined to transfer control, then transferring operative control from the first GCS to the second GCS.

The details of one or more embodiments of the subject matter of this specification are set forth in the accompanying drawings and the description below. Other features, aspects and advantages of the subject matter will become apparent from the description, the drawings, and from the claims.

BRIEF DESCRIPTION OF THE DRAWINGS

FIGS. 4A and 4B illustrate navigating a UAV beyond visual line of sight of a ground control station, according to an embodiment.

DETAILED DESCRIPTION

Figure 1:
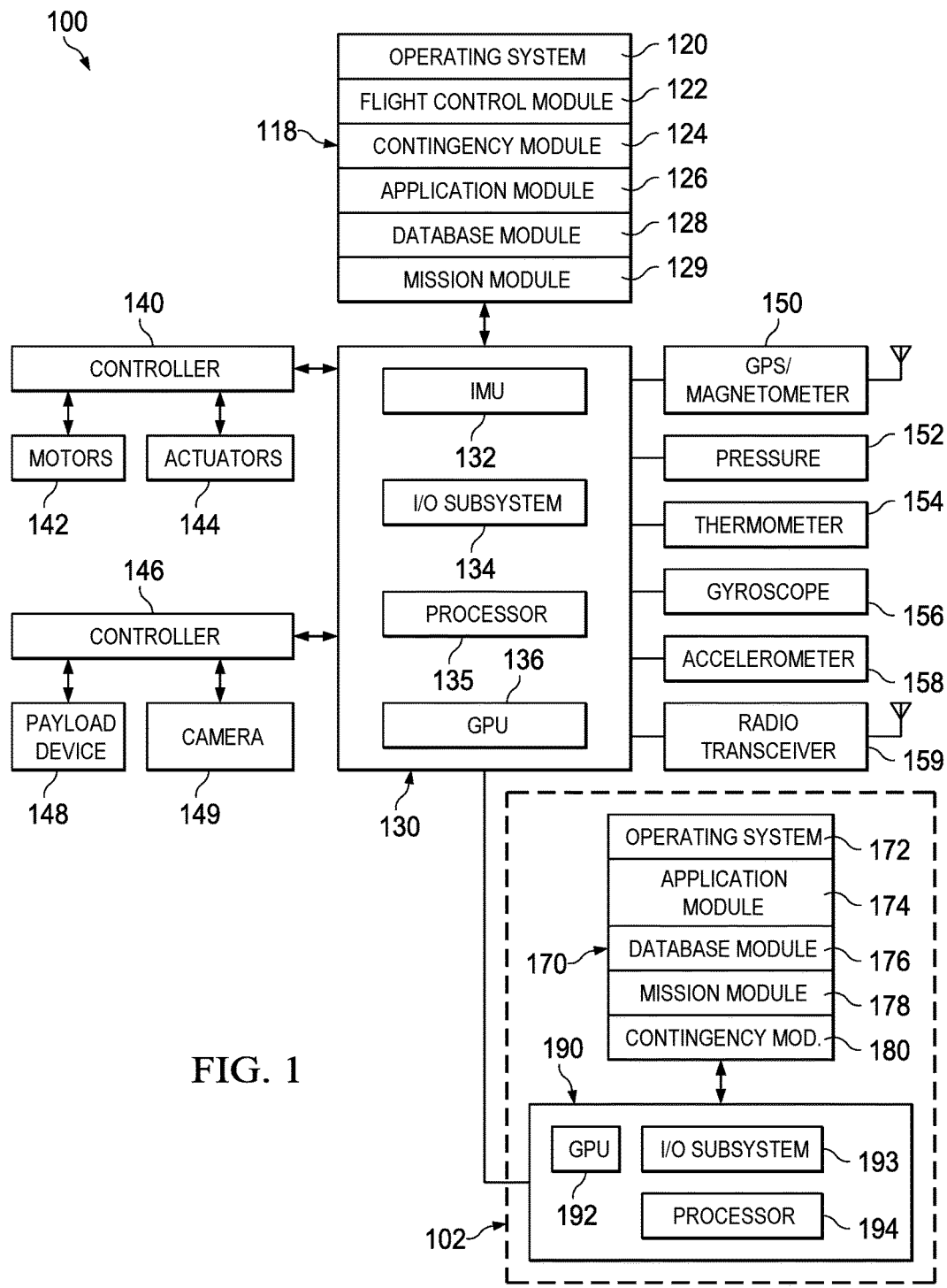
FIG. 1 is a block diagram of an example flight control system architecture for an unmanned aerial vehicle (UAV), according to an embodiment.

FIG. 1 is a block diagram of an example Unmanned Aerial Vehicle (UAV) architecture for implementing the features and processes described herein. A UAV can include a primary computer system 100 and a secondary computer system 102. The UAV primary computer system 100 can be a system of one or more computers, or software executing on a system of one or more computers, which is in communication with, or maintains, one or more databases. The UAV primary computer system 100 can include a processing subsystem 130 including one or more processors 135, graphics processing units 136, I/O subsystem 134, and an inertial measurement unit (IMU) 132. In addition, the UAV primary computer system 100 can include logic circuits, analog circuits, associated volatile and/or non-volatile memory, associated input/output data ports, power ports, etc., and include one or more software processes executing on one or more processors or computers. The UAV primary computer system 100 can include memory 118. Memory 118 may include non-volatile memory, such as one or more magnetic disk storage devices, solid-state hard drives, or flash memory. Other volatile memory such as RAM, DRAM, SRAM may be used for temporary storage of data while the UAV is operational. Databases may store information describing UAV flight operations, flight plans, contingency events, geofence information, component information and other information.

The UAV primary computer system 100 may be coupled to one or more sensors, such as GNSS receivers 150 (e.g., GPS receivers), thermometer 154, gyroscopes 156, accelerometers 158, pressure sensors (static or differential) 152, current sensors, voltage sensors, magnetometers, hydrometers, and motor sensors. The UAV may use IMU 132 in inertial navigation of the UAV. Sensors can be coupled to the UAV primary computer system 100, or to controller boards coupled to the UAV primary computer system 100. One or more communication buses, such as a controller area network (CAN) bus, or signal lines, may couple the various sensor and components.

Various sensors, devices, firmware and other systems may be interconnected to support multiple functions and operations of the UAV. For example, the UAV primary computer system 100 may use various sensors to determine the UAV's current geo-spatial position, attitude, altitude, velocity, direction, pitch, roll, yaw and/or airspeed and to pilot the UAV along a specified flight path and/or to a specified location and/or to control the UAV's attitude, velocity, altitude, and/or airspeed (optionally even when not navigating the UAV along a specific flight path or to a specific location).

The flight control module 122 handles flight control operations of the UAV. The module interacts with one or more controllers 140 that control operation of motors 142 and/or actuators 144. For example, the motors may be used for rotation of propellers, and the actuators may be used for flight surface control such as ailerons, rudders, flaps, landing gear and parachute deployment.

The contingency module 124 monitors and handles contingency events. For example, the contingency module 124 may detect that the UAV has crossed a boundary of a geofence, and then instruct the flight control module 122 to return to a predetermined landing location. The contingency module 124 may detect that the UAV has flown or is flying out of a VLOS from a ground operator, and instruct the flight control module 122 to perform a contingency action, e.g., to land at a landing location. Other contingency criteria may be the detection of a low battery or fuel state, a malfunction of an onboard sensor or motor, or a deviation from the flight plan. The foregoing is not meant to be limiting, as other contingency events may be detected. In some instances, if equipped on the UAV, a parachute may be deployed if the motors or actuators fail.

The mission module 129 processes the flight plan, waypoints, and other associated information with the flight plan as provided to the UAV in a flight package. The mission module 129 works in conjunction with the flight control module 122. For example, the mission module may send information concerning the flight plan to the flight control module 122, for example waypoints (e.g., latitude, longitude and altitude), flight velocity, so that the flight control module 122 can autopilot the UAV.

The UAV may have various devices connected to the UAV for performing a variety of tasks, such as data collection. For example, the UAV may carry a camera 149, which can be, for example, a still image camera, a video camera, an infrared camera, or a multispectral camera. In addition, the UAV may carry a Lidar, radio transceiver, sonar, and traffic collision avoidance system (TCAS). Data collected by the devices may be stored on the device collecting the data, or the data may be stored on non-volatile memory 118 of the UAV primary computer system 100.

The UAV primary computer system 100 may be coupled to various radios, e.g., transceivers 159 for manual control of the UAV, and for wireless or wired data transmission to and from the UAV primary computer system 100, and optionally a UAV secondary computer system 102. The UAV may use one or more communications subsystems, such as a wireless communication or wired subsystem, to facilitate communication to and from the UAV. Wireless communication subsystems may include radio transceivers, infrared, optical ultrasonic and electromagnetic devices. Wired communication systems may include ports such as Ethernet ports, USB ports, serial ports, or other types of port to establish a wired connection to the UAV with other devices, such as a ground control station (GCS), flight planning system (FPS), or other devices, for example a mobile phone, tablet, personal computer, display monitor, other network-enabled devices. The UAV may use a lightweight tethered wire to a GCS for communication with the UAV. The tethered wire may be affixed to the UAV, for example via a magnetic coupler.

Flight data logs may be generated by reading various information from the UAV sensors and operating system 120 and storing the information in computer-readable media (e.g., non-volatile memory 118). The data logs may include a combination of various data, such as time, altitude, heading, ambient temperature, processor temperatures, pressure, battery level, fuel level, absolute or relative position, position coordinates (e.g., GPS coordinates), pitch, roll, yaw, ground speed, humidity level, velocity, acceleration, and contingency information. The foregoing is not meant to be limiting, and other data may be captured and stored in the flight data logs. The flight data logs may be stored on a removable medium. The medium can be installed on the ground control system or onboard the UAV. The data logs may be wirelessly transmitted to the ground control system or to the FPS.

Modules, programs or instructions for performing flight operations, contingency maneuvers, and other functions may be performed with operating system 120. In some implementations, the operating system 120 can be a real time operating system (RTOS), UNIX, LINUX, OS X, WINDOWS, ANDROID or other operating system 120. Additionally, other software modules and applications may run on the operating system 120, such as a flight control module 122, contingency module 124, application module 126, database module 128 and mission module 129. Typically, flight critical functions will be performed using the UAV primary computer system 100. Operating system 120 may include instructions for handling basic system services and for performing hardware dependent tasks.

In addition to the UAV primary computer system 100, the secondary computer system 102 may be used to run another operating system 172 to perform other functions. The UAV secondary computer system 102 can be a system of one or more computers, or software executing on a system of one or more computers, which is in communication with, or maintains, one or more databases. The UAV secondary computer system 102 can include a processing subsystem 190 of one or more processors 194, GPU 192, and I/O subsystem 193. The UAV secondary computer system 102 can include logic circuits, analog circuits, associated volatile and/or non-volatile memory, associated input/output data ports, power ports, etc., and include one or more software processes executing on one or more processors or computers. The UAV secondary computer system 102 can include memory 170. Memory 170 may include non-volatile memory, such as one or more magnetic disk storage devices, solid-state hard drives, flash memory. Other volatile memory such a RAM, DRAM, SRAM may be used for storage of data while the UAV is operational.

Ideally, modules, applications and other functions running on the secondary computer system 102 will be non-critical functions in nature. If the function fails, the UAV will still be able to safely operate. The UAV secondary computer system 102 can include operating system 172. In some implementations, the operating system 172 can be based on real time operating system (RTOS), UNIX, LINUX, OS X, WINDOWS, ANDROID or other operating system. Additionally, other software modules and applications may run on the operating system 172, such as an application module 174, database module 176, mission module 178 and contingency module 180. Operating system 172 may include instructions for handling basic system services and for performing hardware dependent tasks.

The UAV can include controllers 146. Controllers 146 may be used to interact with and operate a payload device 148, and other devices such as camera 149. Camera 149 can include a still-image camera, video camera, infrared camera, multispectral camera, stereo camera pair. In addition, controllers 146 may interact with a Lidar, radio transceiver, sonar, laser ranger, altimeter, TCAS, ADS-B (Automatic dependent surveillance-broadcast) transponder. Optionally, the secondary computer system 102 may have controllers to control payload devices.

Figure 2:
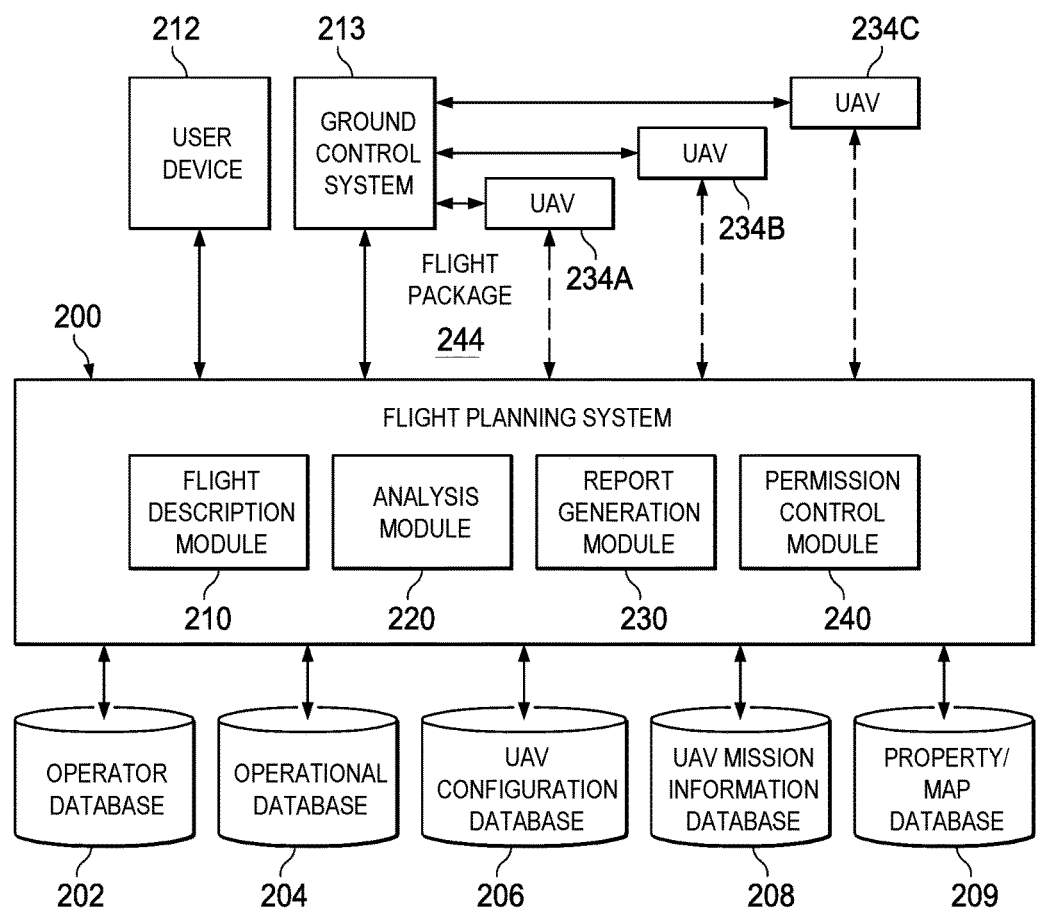
FIG. 2 is a block diagram illustrating an example flight planning system, according to an embodiment.

FIG. 2 is a block diagram illustrating an example FPS 200. The various illustrated components may communicate over wired and/or wireless communication channels (e.g., networks, peripheral buses, etc.). FPS 200 can be a system of one or more computer processors, or software executing on a system of one or more computers. The FPS 200 can maintain and communicate with one or more databases (e.g., databases 202-209) storing information describing prior implemented flight plans and information associated with each flight plan (e.g., information describing a UAV, an operator, property/map, mission, database, and so on). The databases can include operator database 202, operational database 204, UAV configuration database 206, UAV mission information database 208 and property and map database 209.

The FPS 200 can be a system of one or more processors, graphics processors, logic circuits, analog circuits, associated volatile and/or non-volatile memory, associated input/output data ports, power ports, etc., and include one or more software processes executing on one or more processors or computers. The FPS 200 can be a component of, or be coupled to, one or more user devices 212 or a GCS 213. A user device 212 can be a device including one or more processors and configured to send data to and receive data from one or more UAVs 234A, 234B and 234C. A GCS 213 can be a specialized user device 212 configured to control one or more aspects of a flight of UAVs 234A, 234B and 234C.

The FPS 200 may store, and maintain, flight operation information associated with a UAV. Flight operation information may include configuration information of each UAV, flight mission and planned flight path, operator information, the UAV's precise three-dimensional (3D) location in space, velocity information, UAV status (e.g., health of components included in the UAV), contingency plans, and so on. The FPS 200 can receive (e.g., from an operator), and determine, information describing a flight plan. The FPS 200 can provide a flight package 244 associated with the flight plan to a UAV (e.g., UAV 234A, 234B, 234C) to implement. Additionally, the FPS 200 can store flight plan information, flight data log information, job information in the various databases.

The example FPS 200 includes a flight description module 210 that can generate interactive user interfaces (e.g., HTML or XML content for web pages) for rendering on a user device (e.g., user device 212). The interactive user interfaces may optionally be transmitted for display to the user device via a wireless network or other communication channel. User device 212 can receive, from an operator, information describing a flight plan to be performed (e.g., by UAV 234A, 234B, or 234C).

To describe one or more locations where the flight plan is to be conducted, a user interface may be configured to receive, from an operator, location information associated with the flight plan (e.g., an address of a home or property, geospatial coordinates of a structure to be inspected, and so on). The flight description module 210 can obtain information describing the location. For instance, the information can include property boundaries associated with an address (e.g., boundaries of a home, obtained from a database, or system that stores or configured to access property boundary information), obstacles associated with the location (e.g., nearby trees, electrical towers, telephone poles) and/or other information. Additionally, the flight description module 210 can obtain imagery, such as geo-rectified imagery (e.g., satellite imagery), associated with the entered location information. The flight description module 210 can include some or all of the information describing the location (e.g., the obtained imagery or boundary information) in an interactive user interface to be presented on the user device 212 to an operator.

The operator of the user device 212 may interact with user interfaces to describe a flight boundary geofence (as described further below) for a UAV to enforce. For instance, the user device 212 can receive imagery associated with operator-entered location information, and present one or more geofence shapes layered on the imagery. The user interface provides functionality for the operator to select a presented shape (e.g., a polygon), and further provides functionality enabling the operator to drag and/or drop the shape to surround an area of interest in the received imagery to limit allowable locations of a UAV to locations within the shape. Optionally, the user interface may allow the user device 212 to receive input (e.g., of a finger or stylus) tracing a particular shape onto a touch-screen display of the user device 212. The flight description module 210 can store information describing the trace as a flight boundary geofence. Accordingly, the user device 212 can provide information describing the traced shape to the flight description module 210 (e.g., coordinates associated with the imagery). The flight description module 210 can correlate the traced shape to location information in the real world as illustrated by the imagery (e.g., geospatial coordinates that correspond to the traced shape).

Similarly, a user interface can enable the operator to describe safe locations for a UAV to begin the flight plan (e.g., a launching location where the UAV takes off from the ground) and end the flight plan (e.g., a landing location where the UAV lands). As an example, the flight description module 210 can analyze the obtained imagery associated with the entered location information, and identify a geometric center of a convex area (e.g., a biggest convex area) within the geofence boundary that does not include obstructions (e.g., trees). For example, the flight description module 210 can determine an open area, such as an open pasture. Similarly, the flight description module 210 can obtain topographical information associated with the entered location information, and can detect substantially flat areas (e.g., areas with less than a threshold of variance in height). For instance, the flight description module 210 can determine that an open space (e.g., an open clearing that is substantially flat) is a safe launching location for the UAV to take-off from, and can provide information recommending the open space in an interactive user interface presented on the user device 212. Additionally, the flight description module 210 can analyze the obtained imagery and locate physical features that are generally known to be safe locations for take-off and landing. For example, the flight description module 210 can determine that a driveway of a home associated with the flight plan is a safe, and can select the driveway as a safe launching and landing location, or can recommend the driveway as a safe launching and landing location.

The flight description module 210 can receive (e.g., from a user interface) survey or flight mission information via a flight package, for instance information indicating a particular type of survey for a UAV to perform (e.g., damage inspection, inspection of a vertical structure, or inspection of a rooftop). The flight description module 210 can receive waypoints for the UAV to travel to, including an order in which the waypoints are to be traveled to, a ranking or importance of each, or a group of, waypoints, and specific actions for the UAV to take while traveling to, or after reaching, each waypoint. For instance, a user interface can optionally enable the operator using the user device 212 to specify that upon reaching a particular waypoint, the UAV is to activate a particular sensor, or other payload devices, such as an infrared camera, a sensor measuring radiation, and so on. Additionally, a user interface can optionally enable the operator to specify transition speeds the UAV is to use when travelling between waypoints, or between particular waypoints.

In addition to the navigation of the UAV to the waypoints, operations to be performed at a particular location, or waypoint, may be identified by an operator using the FPS 200 or GCS 213 via a user interface. The user interface can allow an operator to photographically inspect a specified location. Operations of the UAV may be automatically configured by either the FPS 200 or GCS 213 depending on the type of inspection to be performed.

The flight description module 210 can receive information describing, or relevant to, configuration information of a UAV, such as a type of UAV (e.g., fixed-wing, single rotor, multi-rotor, and so on). In addition, the flight description module 210 can receive information describing, or relevant to, configuration information of sensors or other payload devices required for the survey or flight mission information, and general functionality to be performed. The flight description module 210 can then determine recommendations of particular UAVs (e.g., UAVs available to perform the flight plan) that comport with the received information. Similarly, the flight description module 210 can determine that, based on the received survey type, a UAV will require particular configuration information, and recommend the configuration information to the operator. For instance, the flight description module 210 can receive information identifying that hail damage is expected, or is to be looked for, and can determine that a UAV that includes particular sensors, and specific visual classifiers to identify hail damage, is needed. For example, the flight description module 210 can determine that a heat and/or thermal imaging sensor that includes specific visual classifiers that can distinguish hail damage from other types of damage (e.g., wind damage, rain damage, and so on) is needed.

The flight description module 210 can utilize received survey or flight mission information to determine a flight pattern for a UAV to follow. For instance, the flight description module 210 can determine a path for the UAV to follow between each waypoint (e.g., ensuring that the UAV remains in the geofence boundary). Additionally, the flight description module 210 can determine, or receive information indicating a safe minimum altitude for the UAV to enforce, the safe minimum altitude being an altitude at which the UAV is safe to travel between waypoints. The safe minimum altitude can be an altitude at which the UAV will not encounter obstacles within the geofence boundary (e.g., a height above buildings, trees, towers, poles and so on). Similarly, the safe minimum altitude can be based on a ground sampling distance (GSD) indicating a minimum resolution that will be required from imagery obtained by the UAV while implementing the flight plan (e.g., based in part on capabilities of an included camera, such as sensor resolution, sensor size, and so on).

The flight description module 210 can receive a time that the flight plan is to be performed (e.g., a particular day, a particular time at a particular day, a range of times, and so on). The flight description module 210 can then determine an availability of UAVs and/or operators at the received time(s). For example, the flight description module 210 can obtain scheduling information. Additionally, the flight description module 210 can filter available UAVs according to determined configuration information (e.g., as described above). Optionally, the flight description module 210 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows). The flight description module 210 can determine the flight plan accordingly.

The FPS 200 can provide the determined flight plan as a flight package 244 directly to a UAV (e.g., the UAV 234A, 234B or 234C). Optionally, the FPS 200 can provide the flight package 244 to a user device 212 or GCS 213. The user device 212 or GCS 213 can modify the flight plan or preserve the flight plan in the flight package 244 as received. The user device 212 or GCS 213 can transmit the flight package 244 to the UAV 234A, 234B or 234C. Optionally, the flight package 244 can include a flight manifest file (e.g., an XML, file) identifying necessary application and version information to conduct the flight plan. For instance, the UAV can be required to execute a particular application (e.g., "app" downloaded from an electronic application store) that provides functionality necessary to conduct the flight plan. As an example, an application can effect a flight plan associated with inspecting vertical structures, and the UAV can be required to execute the application prior to initiation of the flight plan.

In particular, the FPS 200 may create a flight plan for automated or partially automated flight of a UAV, taking into consideration structural data to avoid situations where the UAV may fly out of VLOS of a base location. The base location can include one or more locations of an operator of a UAV. In some implementations, the base location can be a geospatial position of the user device 212 or a launching location of the UAV.

The FPS 200 may receive, via a user interface, a location for an aerial survey to be conducted by an unmanned aerial vehicle. One or more images may be displayed depicting a view of the location. The interface allows for a selection of a launching location of the UAV. As the images have associated geospatial positions, the FPS 200 can determine an associated latitude/longitude for the launching location. The user interface may receive an input or selections for one or more flight waypoints. Similar to the launching locations, the flight waypoints having an associated geospatial position. The FPS 200 may assign altitudes for the flight waypoints, or altitudes for the flight waypoints may be determined by a user, and specific numeric altitudes values may be set.

The FPS 200 may determine based on the launching location and altitude of the one or more flight waypoints whether a flight waypoint may cause a non-VLOS occurrence. From the launching location, a flight plan may be generated using waypoints having an associated latitude and longitude coordinates, and an associated altitude. The FPS 200 may not allow a UAV waypoint where the VLOS from the base location (e.g., the launching location, or an area around the launching location), upon determining that the waypoint would be blocked because of a structure. The FPS 200 may use 3D polygonal data, topographical data or other structure data in generating the flight plan. The system can use a 3D coordinate system to determine, based on a base location and each waypoint location, whether the UAV would likely enter into a non-VLOS situation. The flight planning system 200 can then generate flight plan that avoids the non-VLOS situation, and including only the flight waypoints that would not cause a non-VLOS occurrence.

The flight planning system 200 may present, via an interface, one or more recommended launching locations for the UAV that provides an operator an ideal location to obtain a best or maximum VLOS when operating the UAV around a structure. Lines from multiple points on the flight path, for example from each waypoint, at the flight path altitude can be computed and projected to various point locations on the ground. Point locations on the ground where the lines from the points on the flight path that do not intersect the structure may be identified as an ideal location for the operator with VLOS vantage point, making the location suitable as a launching location. A recommended launching location may be selected by the user, and the launching location is used as part of a primary flight plan. Additionally, a backup launching location with a secondary (an alternative) flight plan may be created. There may be situations when arriving at a survey site, that a physical inspection proves that the launching location of the primary flight plan is unsuitable. For example, foliage, trees, plants, new structures, etc. not shown in an aerial image used to plan the survey may now be present. These plants and structures may block the UAV from safely ascending to an inspection altitude. While at the inspection site, the operator of the GCS 213 may then select the secondary flight plan and launching location to conduct the inspection. Both the primary flight plan, and the secondary flight plans with the alternative launching locations may be transmitted by the flight planning system 200 to the GCS 213 or directly to a UAV. While the FPS 200 is configured to perform operations described for determining a launching location to provide ideal VLOS, the user device 212 or GCS 213 may also perform the operations described for selecting a launching location and waypoints to provide VLOS while operating a UAV.

Additionally, the FPS 200 may determine a geofence boundary to limit flight of the UAV to a bounded area. The user interface may display the geofence boundary over one or more location images. Additionally, the FPS 200 may determine a survey area, and set the survey area within the geofence boundary.

The FPS 200 then receives, from a GCS 213 (or directly from the UAV), flight log data and collected sensor data after the UAV has conducted the flight plan. A user interface of the FPS 200 then displays at least a portion of sensor data collected by the UAV, and information associated with the flight data package.

Similar to the FPS 200, the GCS 213 may also be used for flight and contingency planning. The GCS 213 can receive flight plans from the FPS 200 for transmission to the UAV. The GCS 213 also allows for manual override of a UAV operating in an autopilot mode. A flight plan may be transmitted to the UAV either via a wireless or tethered connection. Ideally, the GCS 213 is a mobile device, such a laptop, mobile phone, tablet device, with a cellular and other wireless connection for data transmission over the Internet or other network.

Each of user device 212, including specialized user device 212 designated as GCS 213, can be a system of one or more computers, or software executing on a system of one or more computers, which is in communication with, or maintains, one or more databases, e.g., databases, storing information describing UAV flight operations and components. Each of user device 212 can be a system of one or more processors, graphics processors, logic circuits, analog circuits, associated volatile and/or non-volatile memory, associated input/output data ports, power ports, etc. Each of user device 212 can include one or more software processes executing on one or more processors or computers.

Although in one embodiment of the invention, the FPS 200 may be primarily used to create and transmit a flight package 244 to a UAV or GCS 213, the UAV or GCS 213 can initiate the request for a flight package 244 from the FPS 200. An operator may take the UAV or GCS 213 to a property location. The UAV or GCS 213 may then request a flight package, or an updated flight package using a current position of the UAV or GCS 213. For example, the UAV or GCS 213 can determine its geospatial position via a GNSS receiver (using GPS, GLONASS, Galileo or Beidou system). The UAV or GCS 213 can then transmit its location to the FPS 200, along with other identifying information about the requesting device, such as its unique identifier (UID), or media access control (MAC) address, etc. The FPS 200 will receive the request, and determine if an updated or changed flight package exists by comparing the device identifier with identifiers in a database storing the new or updated flight package information. If FPS 200 finds a new or updated flight package, then the FPS 200 transmits the flight package from the FPS 200. The UAV or GCS 213 can receive the flight package. A confirmation acknowledging receipt of the flight package may then be transmitted from the UAV or GCS 213 to the FPS 200. The FPS 200 will then update a database record to indicate that the particular flight package has been received. Moreover, the UAV or GCS 213 can supply the property location, and a new job request can be sent to the FPS 200. The FPS 200 may create a new flight package for the UAV or GCS 213.

For autonomous flight of a UAV (UAV 234A, 234B, or 234C), a flight plan may be created and transmitted to the UAV. The flight plan instructs the UAV with regard to a particular flight path. A flight plan may be created using a FPS 200, or a GCS 213. A flight plan instructs the UAV where it should fly in a 3D space. The flight plan includes a series of connected waypoints that define where the UAV should fly and what actions that the UAV should complete during a particular flight. The UAV may have an autopilot flight module operating on a UAV computer system that uses the flight plan to automatically fly the UAV. The flight plan information may be provided to the GCS 213 and then to the UAV or directly to the UAV, in a flight package 244 comprising the flight plan and other information (such as contingency event instructions).

Using the FPS 200, or GCS 213, a UAV operator may select a series of geographically-based waypoints and a launching location for the UAV. Based on the waypoints, a flight plan may be constructed allowing the UAV to autonomously navigate itself. In some implementations, the FPS 200 or GCS 213 may automatically define a flight plan based on various criteria, such as an inspection type.

While the UAV computer system autopilot module is navigating the UAV according to a flight plan, certain aspects of the flight pattern may be controlled by the operator's user device 212. The flight plan or pattern may be configured such that for a particular waypoint, a vertical ascent/descent rate, UAV altitude, horizontal UAV rotation, payload gimbal, payload direction, waypoint transition speed, or trigger of a payload sensor may be controlled by the operator. The user device 212 may have a physical control device such as a toggle or joystick, or virtual control in a user interface that allows the operator to control vertical ascent/descent rate, UAV altitude, UAV attitude, horizontal UAV rotation, payload gimbal, payload direction. The user device 212 can trigger a payload sensor while conducting the inspection. For example, the UAV may navigate via autopilot to a position over an inspection location. An operator then can provide input to the user device 212. The user device may transmit a signal or information corresponding to the user input to the UAV via radio communication. The signal or information can control the vertical ascent/descent rate, UAV altitude, UAV attitude, horizontal UAV rotation, payload gimbal, or payload direction, or waypoint transition speed. The signal or information to can trigger a payload sensor to turn on or turn off. This particular mode allows for partial autopilot control and partial or complete manual control of the UAV. Even though the operator may manually control certain aspects of the flight plan, if one has been set, the UAV can remain within a geofence boundary envelope and to remain within VLOS of the operator operating user device 212.

In another example, the UAV may be partially manually controlled by an operator using the user device 212 while the UAV is in autopilot mode. The UAV may receive a command from the user device 212 to nudge the UAV in a particular direction. In this case, the control input of the user device 212 causes the user device 212 to send a command to the UAV, instructing the UAV to move slightly, for example between 0.1 to 3 meters, in a particular direction (in an x, y, or z axis, or diagonally). The particular distance can be predetermined, or be variable based on the proximity to a structure. Nudging the UAV allows the operator to move the UAV away from the structure if the operator sees that the UAV flying too close to the structure. The nudge command may be provided any time to the UAV while it is operating in an auto-piloted mode. The UAV should still enforce geofence boundaries (if one has been set) and not allow a nudge to cause the UAV to move beyond a geofence boundary envelope.

The FPS 200 can include an analysis module 220, a report generation module 230 and a permission control module 240. The analysis module 220 is configured to analyze a flight plan and determine whether a flight path include any sections where a UAV is out of VLOS from a base location, and provides alerts to warn such possible VLOS occurrence. The report generation module 230 is configured to generate one or more flight reports. The flight reports can include flight data (e.g., path, duration and actions of control surfaces), sensor data (e.g., air pressure, temperature and humidity), and payload data (e.g., information gathered by a payload camera). The permission control module 240 is configured to impose one or more limits on flights of the UAV. The limits can include, for example, that the UAV shall stay inside or outside an envelope defined by geofences or by geographic coordinates, or that the UAV shall stay within VLOS of a base location (e.g., a location of user device 212).

Figure 3:
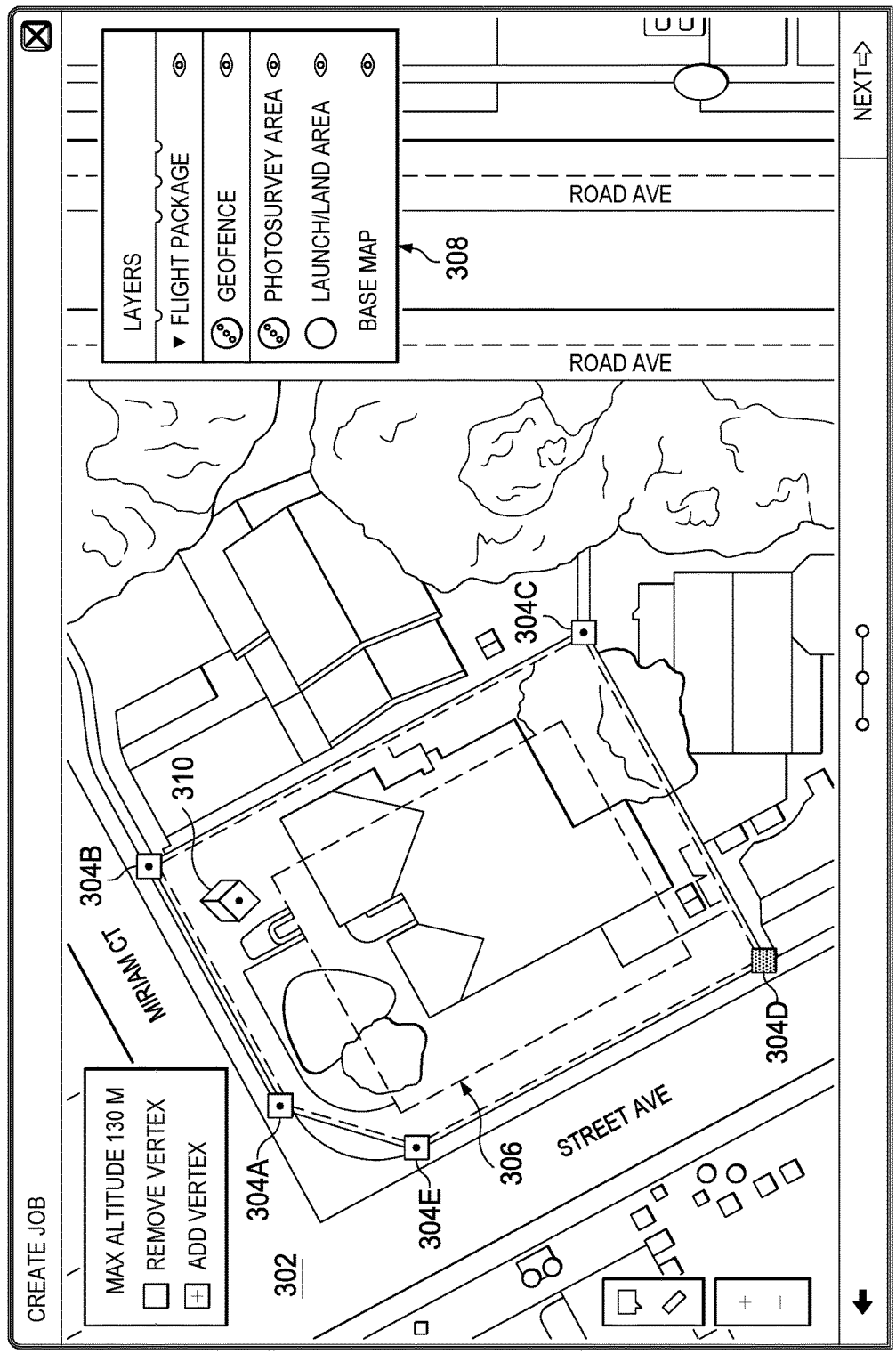
FIG. 3 illustrates an example user interface for determining a flight boundary geofence, according to an embodiment.

FIG. 3 illustrates an example user interface 300 for determining a geofence boundary. The user interface 300 is an example of an interactive user interface, generated by a system (e.g., the FPS 200, or a presentation system in communication with the FPS 200) that is configured to receive user inputs, access one or more databases, and update the user interface 300 in response to received user inputs. The user interface 300 can include a document (e.g., an interactive document such as a web page), presented on a user device (e.g., a desktop, laptop, or tablet computer, a smartphone, or a wearable device, etc.).

The user interface 300 includes image 302 (e.g., satellite imagery as depicted) of a location entered by the user of the user interface 300. The image 302 included in the user interface 300 can be interactive. A user can zoom in and out of the image 302 to target a greater or smaller real-world area. For instance, the user can interact with a zoom control, or the user can utilize a touch surface (e.g., a touch screen) to zoom in and out (e.g., the user can pinch to zoom).

The user interface 300 enables the user to select areas on the image 302 that are defined by a user-specified shape. For example, the user interface 300 can receive a user selection of particular vertices that define the illustrated polygon (e.g., vertices 304A-E). The system can shade, or otherwise highlight, the internal portion of the user-specified shape. Additionally, the user interface 300 enables the user to select a particular vertex of the illustrated polygon (e.g., vertex 304A), and drag the shape into existence by moving a finger or stylus on a touch sensitive screen of the user device.

The user interface 300 can receive input for generating a flight path 306 for the UAV to include a launching and landing location 310. The user interface 300 may include a menu 308 for creating different representative layers of a flight plan. For example, menu 308 shows a flight plan specifying a geofence, a photo survey area, a launch/land area, and a base map. The menu 308 includes a geofence menu item that refers to the geofence as represented by the connected vertices 304A-304E. The menu 308 includes a photo survey area menu item representing the flight path 306. The menu 308 includes a launch/land area menu item representing the launching/landing locations 310. The menu 308 includes a base map menu item that represents the base image layer, which includes image 302.

As illustrated in FIG. 3, the image 302 includes a highlighted area that defines a geofence boundary to be enforced by a UAV when implementing a flight plan. Different types of geofences may be used by the UAV during flight operations. A geofence can include a two-dimensional (2D) or 3D location-based boundary. A geofence can be understood as a virtual boundary for a geographic location or a virtual surface around a geographic location in a 3D space. The geofence boundary can be represented on a map as one or more polygonal or rounded shapes, for example, a circle, rectangle, sphere, cylinder, cube, or other shapes or bodies. A geofence may also be a time-based (four-dimensional) virtual boundary where the geofence exists for a particular duration, for example, a number of hours or days, or for a specific time period, for example, from 2:00 PM to 4 PM occurring on certain days, or other periods of time. A 3D geofence may exist in a particular space above ground. A geofence may be represented by latitudinal and longitudinal connected points, or other coordinate systems. A geofence may be created such that the geofence has dynamic aspects where the geofence may increase or decrease in size based on various conditions. For UAV flight operations, geofence structures are received by the UAV and stored in non-volatile memory.

For UAV operations, different types of geofences may be created. To limit flight operations within a particular volumetric space, a 3D geofence may be created. Data representing the flight boundary geofence can be transmitted to the UAV operating system. The exemplary FPS or GCS may be used to create the geofence and transmit the geofence data structure to the UAV.

For both autonomous UAV flight operations and manually controlled flight operations, the UAV can be limited to flight within a flight boundary geofence. If for example, an operator of the UAV in a manually controlled mode attempts to maneuver the UAV outside of the flight boundary geofence, the UAV may detect a contingency condition (e.g., the UAV is about to fly outside of the geofence), and then automatically direct the UAV to return to a specified predetermined landing location. Furthermore, if the UAV is capable of hovering, such as a multi-rotor UAV, the UAV may be inhibited from moving across a flight boundary geofence, or perimeter, of the geofence, and the UAV can be set to hover and not continue past the perimeter of the geofence.

Optionally, the system can utilize property information, such as property boundaries, and automatically include a highlighted portion of the image 302 as being a possible flight boundary geofence. For instance, as illustrated in FIG. 3, portions of the flight boundary geofence defined by connected vertices 304A, 304B, 304C, 304D and 304E abut roads included in the real-world geographic area depicted in the image 302. The system can determine that the entered location information describes a particular property (e.g., an open clearing that borders the road), and can highlight the particular property. Optionally, the system can include a buffer from the property boundaries of the location to ensure that even when facing forces of nature (e.g., in a strong gust of wind), the UAV will remain within the property boundaries.

Property boundary information from a database can be used to create the flight boundary geofence to limit flight of the UAV within the property's boundary. The UAV can then be constrained for flight operations only within this geofence. The property information used to create the flight boundary geofence can be of various data types, for example, parcel polygons, vector, rasterized, shape files or other data types. For the particular property, the FPS 200 may create the flight boundary geofence based on the property shape data. The various data types ideally can have geolocation and/or coordinate information, such as latitudinal/longitudinal points for use in orienting and creating the flight boundary geofence. The geofence envelope may be identical in shape to the property boundary. Optionally, the boundary of the geofence may be reduced in size. For example, the flight boundary geofence may be reduced in size by a set distance, for example 5 meters, towards a centroid of the property. Reduction of the flight boundary geofence creates a buffer zone. The buffer zone may help avoid an unintentional flyover of an adjacent property boundary. Optionally, the FPS may display an area with parcel polygonal data. An interface of the FPS may then receive a selection of one or more parcels. The FPS then can use the selections to create one or more jobs, and multiple geofence envelopes. For the multiple parcels, the operator would go to each parcel property, and conduct multiple jobs.

Optionally, the user interface 300 can be utilized by a UAV operator to indicate waypoints to be traveled to during the flight plan. For instance, the user can select portions of the image 302 to designate as waypoints, and the user interface 300 can be updated to present selectable options associated with each waypoint. As an example, the user can designate an order that each waypoint is to be traveled to, actions the UAV is to take at the waypoint, a transition speed between each or all waypoints, and so on. The system can determine the flight boundary geofence from the waypoints, such that the geofence perimeter encompasses the waypoints. The determined flight boundary geofence can be presented to the user for review, and the user can modify the boundary by interacting with the user interface 300.

Additionally, the user interface 300 can include text provided by the user that describes the flight plan. A different user can access the user interface 300, and quickly view the determined flight boundary geofence along with text describing the flight plan. In this way, a user can quickly describe flight plan information sufficient for a UAV to implement, and other users can quickly view graphical representations of the flight plan (e.g., graphical representation of the flight boundary geofence along with textual data describing the flight plan).

Determining Beyond Visual Line of Sight Conditions

In an embodiment, FPS 200 can identify handoff zones along a UAV flight corridor for transferring control of the UAV between ground control stations. The start of the handoff zones can be determined prior to a flight or while the UAV is in flight. For handoff zones determined prior to flight, FPS 200 can identify suitable locations to place GCSs to ensure a safe and secure handoff of control of the UAV along a predetermined flight corridor. The handoff zone can be based on a threshold visual line of sight range between a controlling GCS and the UAV. For determining handoff zones while in flight, the UAV can monitor RF signals from each GCS participating in the handoff to determine the start of a handoff period, as described with reference to FIG. 4A.

In an embodiment, the range can be calculated by normalizing the difference between the position of a GCS and the position of the UAV in a common reference coordinate frame. In another embodiment, the range can be calculated using RF signal propagation model. The threshold range can be determined based on limits of human vision and/or the transmission capabilities (e.g., transmission range) of the UAV and GCS RF transmitters. The threshold range can be determined by the GCS controlling the UAV, by the UAV or by another entity. In the case of a mobile GCS, the mobile GCS can have location determination capability, such as an onboard GPS, or can obtain its location from an external source (e.g., a pseudolite). If the UAV is determining the threshold range, the mobile GCS may periodically transmit its location to the UAV. In an embodiment, the threshold range can be adjusted based on meteorological conditions or a 3D terrain model. For example, a cloudy day or cloud ceiling can cause a visual line of sight to be lost sooner than on a clear day. For such cases, the visual line of sight range can be adjusted by FPS 200 to account for such weather conditions. The updates may also be calculated while the UAV is in flight to account for sudden changes in weather that were not accounted for in the original flight plan. Additionally, FPS 200 can simulate the UAV flight using a 3D terrain model to determine whether the visual line of sight will be blocked by terrain (e.g., hills, foliage) or man-made structures (e.g., buildings), as described with reference to FIG. 4B.

In an embodiment, the threshold range may be used independent of a handoff to another GCS to limit the distance a UAV may be flown from a controlling GCS, e.g., define a boundary geofence defining a maximum distance the UAV can fly from the controlling GCS. In an embodiment, the UAV could hover and wait at the geofence boundary for a handoff to another GCS to complete before crossing the boundary geofence.

In an embodiment, a message or signal can be sent by the operator of a controlling GCS to the UAV indicating a likely beyond visual line of sight condition. For example, the controlling GCS may have a graphical user interface with a user affordance, such as an icon presented via a display indicating a potential beyond visual line of sight condition. Additionally, a manual controller may have a toggle, or other switch that may be used to indicate a beyond line of sight condition. Selecting the icon, or activating the toggle or switch, would transmit a command to the UAV. In response, the UAV would be permitted to fly beyond the threshold range after completion of a hand-off. In an embodiment, if the message or signal is sent, the UAV could hover after receiving the command and wait for a hand-off to another GCS to complete.

In an embodiment, FPS 200 can determine waypoints along the flight corridor at which handoff of control of the UAV between ground control stations would occur. The waypoints can be associated with geofences, which when crossed by the UAV initiate handoff procedures. Upon crossing the geofence, the UAV can automatically fly a holding pattern (e.g., fly in a circle or hover) until handoff is completed.

Navigating UAV Beyond Visual Line of Sight

Figure 4A:
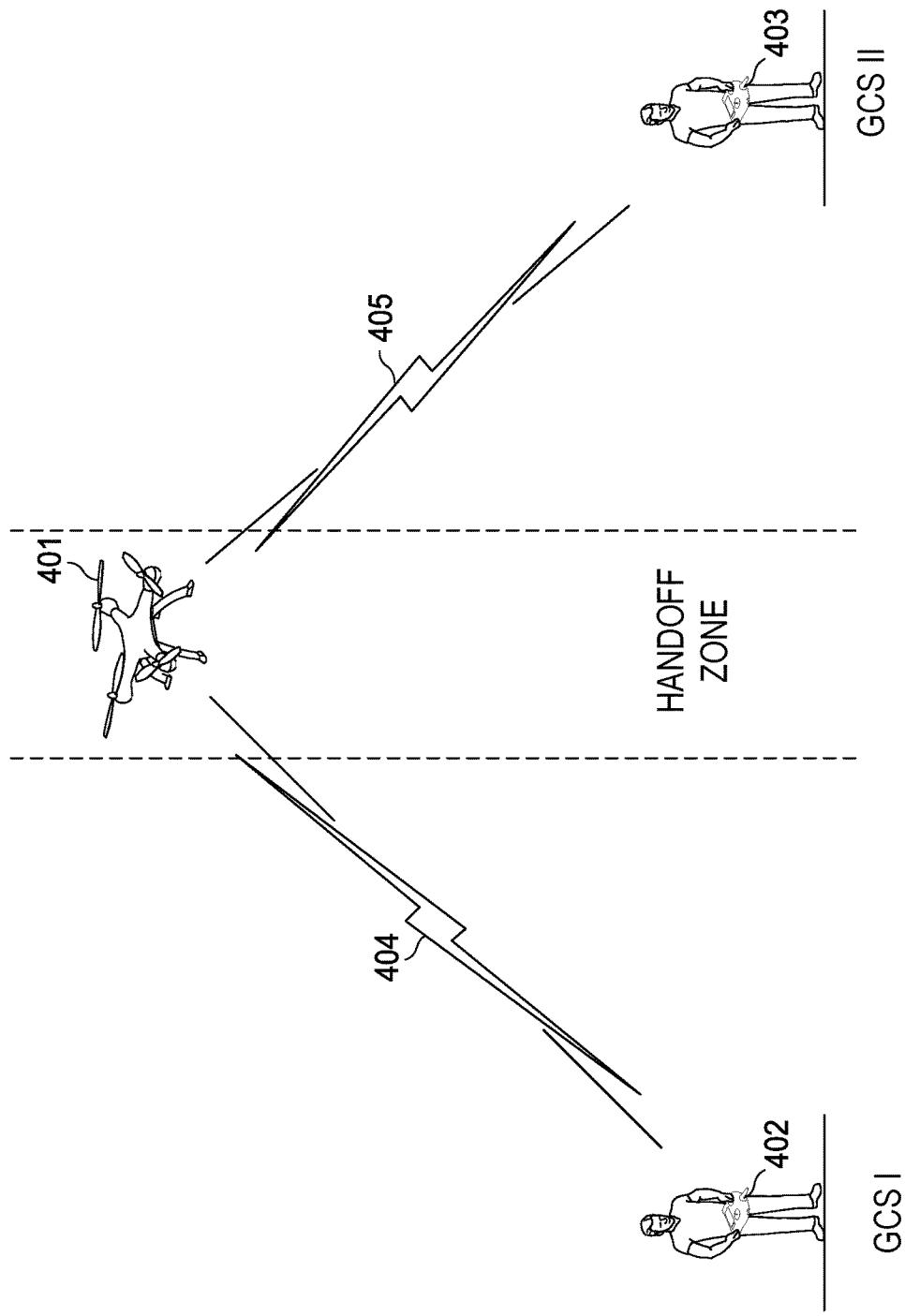

FIG. 4A illustrates navigating a UAV beyond visual line of sight of a ground control station, according to an embodiment. UAV 401 can be flying an automated flight plan or flown manually. UAV 401 is under control of GCS 302 (GCS I) using RF signal 404. GCS 403 (GCS II) would like to take over operative control of UAV 301 using RF signal 405 when UAV 401 is beyond visual line of sight of GCS 402. It is important to ensure that control of UAV 401 is handled in a safe and secure manner. To ensure safety, GCS 402 should not relinquish control of UAV 401 until GCS 403 has been granted control. Additionally, any updates to the flight plan that may have occurred while UAV 401 was under the control of GCS 402 need to be made available GCS 403 so that GCS 403 can successfully complete the mission. To ensure security, GCS 403 must be authenticated by UAV 401 before control is granted to prevent an unauthorized GCS from taking control of UAV 401. The process of authentication and handoff of control takes time. In addition to this time, there needs to be sufficient time to handle contingency conditions should the handoff of control fail for any reason. Reasons for failure can include but are not limited to: failed authentication of GCS 403, loss of signals from GCS 402, 403 and the like.

To ensure a safe and secure handoff of control of UAV 401, the handoff can occur in a "handoff zone." In an embodiment, a handoff zone can be defined by a handoff period ($t_0$-$t_1$) in which the handoff must be completed successfully or a contingency operation will be invoked by the UAV. The start and end of the handoff period can be determined by a variety of methods. In an embodiment, the start of the handoff period can be based on the characteristics or a change in the characteristics of one or both of RF signals 404, 405 transmitted by GCS 402 and GCS 403, respectively, as observed by UAV 401. For example, the start of the handoff window ($t_0$) can be when a received signal strength indicator (RSSI), signal-to-noise ratio (SNR) or carrier-to-noise (C/N) calculated from one or both of RF signals 404, 405 fall below or exceed threshold values. The threshold values can be set to allow for margins of error. In an embodiment, the rate of change of characteristics (e.g., signal strength) of RF signals 404, 405 can be used to determine the start of the handoff period. For example, the handoff period can start when UAV 401 determines that RF signal 404 is decreasing at a first rate and RF signal 405 is increasing at a second rate.

In another embodiment, a bit error rate (BER) of a digital message modulated on RF signals 404, 405 or some other data error metric (e.g., packet loss) can be used to determine the start of the handoff period. In an embodiment, the ranges or line of sight angles from GCS 402 and GCS 403 to UAV 401 can be used to determine the start of the handoff period. In an embodiment, UAV 401, GCS 402 and GCS 403 work together to determine the start of the handoff period. For example, GCS 402 and GCS 403 can communicate through a separate channel and share their respective locations (e.g., determined by GNSS receivers), transmission characteristics and limits, line of sight angles, etc.

In an embodiment, measurements of RF signals 404, 405 are stored by UAV 401 and used in a predictor to predict when RF signal 404 will be lost or obtained by a threshold amount. The prediction result can be used to specify the start of the handoff period at a future time. The prediction can use 3D terrain models to determine physical structures that may block visual line of sight to UAV 401 along the flight path. The use of a predictor allows for authentication of GCS 403, syncing of updates to the flight plan and any other housekeeping tasks to be completed before the handoff period starts, which may result in a shorter handoff period.

Before or during the handoff period, GCS 403 registers with UAV 401 and is subjected to an authentication process using, for example, one or more cryptographic processes. In an embodiment, a trusted service can provide private keys to authorized GCS operators using a symmetric-key-based scheme for authentication. In another embodiment, public key cryptography (PKC) and/or elliptic curve cryptography (ECC) are used for authentication. In yet another embodiment, Certificate-less Signcryption Tag Key Encapsulation Mechanism (eCLSC-TKEM) is used to authenticate GCS 403. After GCS 403 is authenticated by UAV 401, UAV 403 can download the updated flight plan to GCS 403. In an embodiment, the flight plan is digitally signed. If GCS 403 already has a copy of the flight plan, then UAV 401 can synchronize updates to the flight plan at GCS 403.

The duration of the handoff period can be based on an estimated amount time to perform all of the steps required for a safe and secure handoff. These steps include but are not limited to: establishing a bi-directional communication link with GCS 403, authenticating GCS 403, downloading or syncing an updated flight plan and other data to GCS 403, transitioning control from GCS 402 to GCS 403, notifying GCS 402 and GCS 403 of completion of the transfer of control and acknowledgement by GCS 402 and GCS 403 of the transfer of control. If some of these steps are performed prior to the handoff period, then the estimated time may be shorter. The estimated handoff period duration can include a number of attempts for each step in the event first attempts fail. UAV 401 can keep track of the attempts using one or more software or hardware counters implemented in FPS 200.

In some cases, the number of attempts for a particular step in the handoff process are exhausted. In such case, UAV 401 can execute a contingency flight plan. For example, UAV 401 can set a course to return to its home base, loiter at its current location (e.g., hover for rotary UAV, fly in circles for fixed wing UAV) for a maximum period of time to try and restore a failed radio link, adjust altitude (if allowed by the flight plan) or any other suitable contingency plan.

In an embodiment, one or both of GCS 402 and GCS 403 are mobile. The UAV 401 can determine an optimal location for the GCS 403 to be located along a flight path to ensure that a visual line of sight will be established prior to or during the handoff period or at specified time in the flight plan. For example, UAV 401 can use its current position, velocity and altitude (e.g., obtained from an onboard GNSS receiver) to predict its location at a future time when handoff is desired to occur. UAV 401 can determine a geographic area in which the GCS 403 should be located to ensure a visual line of sight of UAV 401 at the future time. A 3D terrain model can be utilized to determine the future time such that the size of the geographic area can be maximized. Once the geographic region is determined a list of suggested locations can be downloaded to GCS 403. In an embodiment, a list of public points of interest in the geographic area (e.g., public parks, schools) using a map database (e.g., Open POIs, OpenStreetMap) can be provided to GCS 403 so that publicly accessible area free of physical structures can be selected for the location of GCS 403.

In an embodiment, FPS 200 on UAV 401 (or a flight simulator at a ground-based location) can simulate a flight path of UAV 401 according to a flight plan and determine, based on the flight plan, if UAV 401 will be beyond visual line of sight of GCS 402 or GCS 403 at any time during a mission described by the flight plan. FPS 200 or flight simulator can then alter the flight plan to ensure that UAV is always within visual line of sight of at least one of GCS 402 and GCS 403 throughout a mission and both GCS 402 and GCS 403 during a handoff period. If a constraint in the original flight plan is not violated by the altered flight plan (e.g., an altitude limit violated), the altered flight plan can be used by UAV 401 in place of the original flight plan.

FIG. 4B illustrates navigating a UAV beyond visual line of sight of a ground control station using a 3D terrain model, according to an embodiment. GCS 402 (GCS1) is controlling UAV 401 with communication line 404. When UAV 401 flies over structure 406 a beyond visual line of sight condition has occurred. GCS 403 can assume control of UAV 401 on the other side of structure 406 after completing handoff procedures, as described with reference to FIG. 4A. In this example, a handoff zone would be defined at structure 406. UAV 401 would fly a holding pattern (fly in a circle or hover) within boundary geofence 408 until GCS 403 obtains control of UAV 401. When handoff of control of UAV 401 to GCS 403 is completed, UAV can be allowed to cross geofence 408 and continue on its mission. In an embodiment, structure 406 would be included in a 3D terrain model and accounted for in determining a location of the handoff zone.

FIG. 5-8 are flowcharts of example processes for navigating a UAV beyond visual line of sight of the ground control station, according to an embodiment. Process 500, 600, 700 and 800 can be performed by a UAV and/or the UAV and one or both ground control stations in a handoff scenario.

Figure 5:
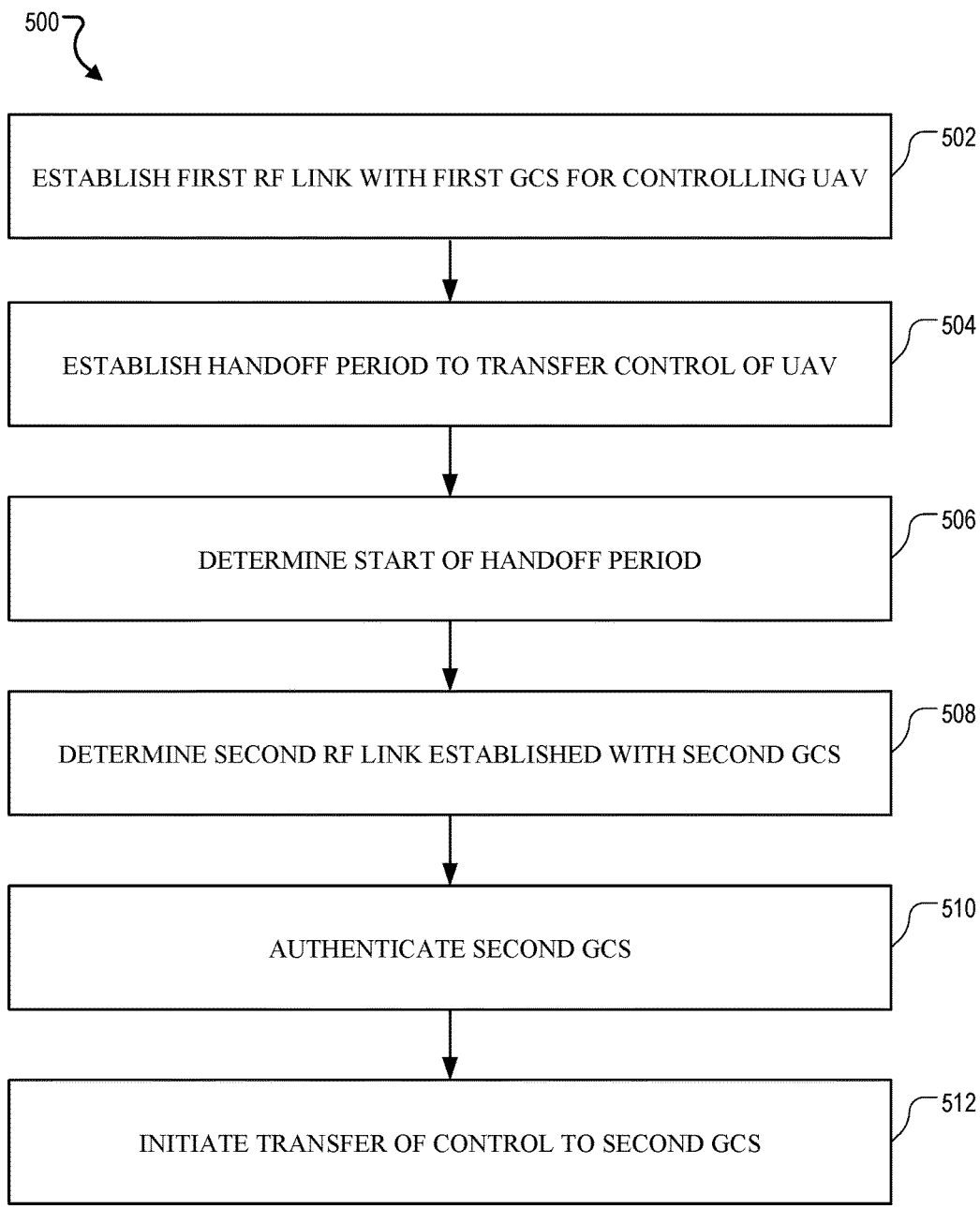
FIG. 5-8 are flowcharts of example processes for navigating a UAV beyond visual line of sight of the ground control station, according to an embodiment.

Referring to FIG. 5, process 500 includes establishing a first RF communication link with a first GCS for controlling a UAV (502), establishing a handoff period to transfer control of the UAV from the first GCS to a second GCS (504), determining a start of the handoff period (506), determining a that a second RF communication link is established with the second GCS (508), authenticating the second GCS (510) and initiating transfer of control to the second GCS (512). The start of the handoff period can be determined by the UAV during flight or can be previously determined and included in the flight plan. In an embodiment, if the handoff of control of the UAV from the first GCS to the second GCS fails for any reason or a particular reason, the UAV can execute a contingency plan or action. For example, the UAV can change its flight path if such change does not violate a constraint in the flight plan (e.g., an altitude, geofence boundary or mission constraint). Alternatively, the UAV can set a coarse to fly back to its home base.

Figure 6:
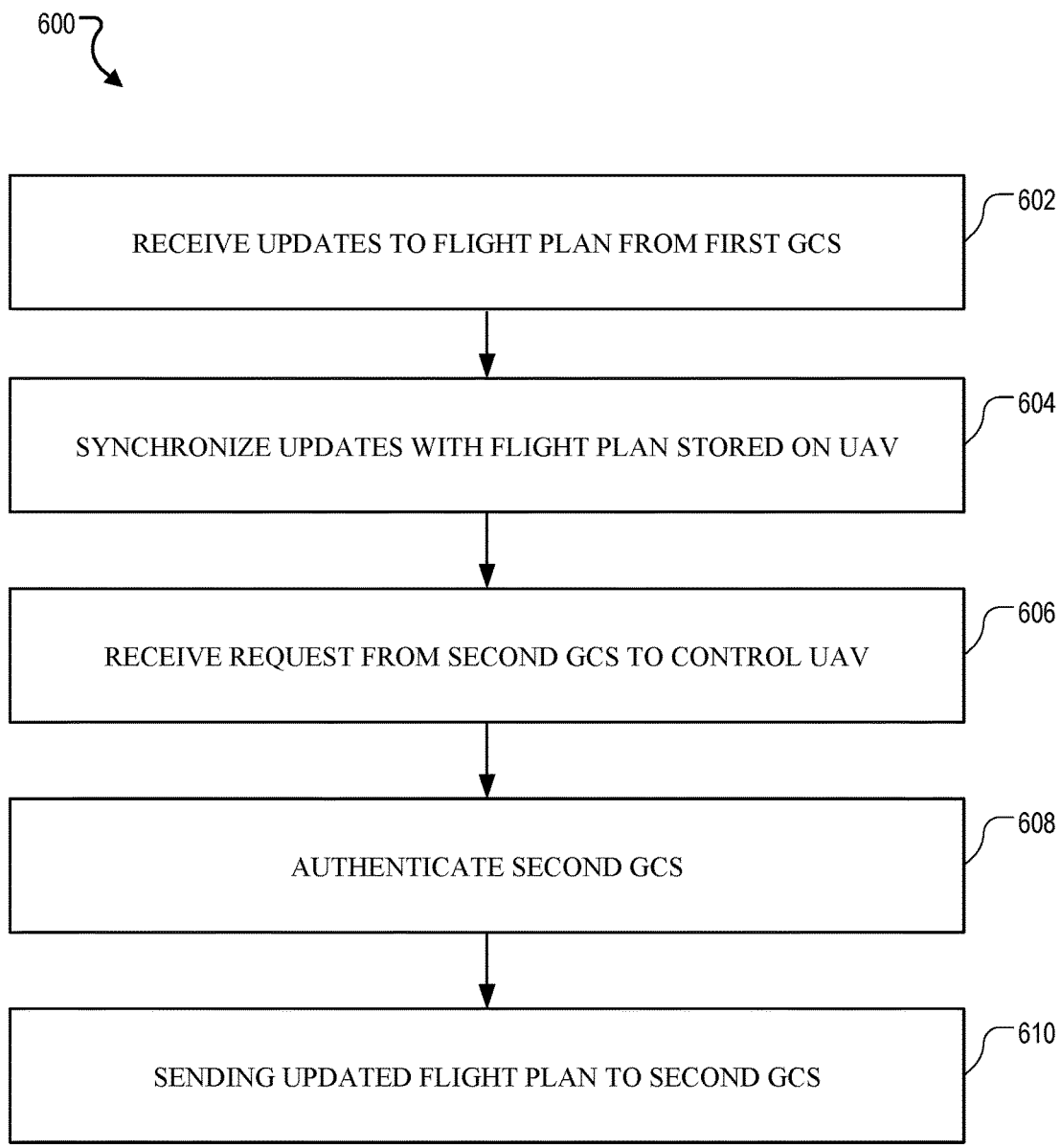

Referring to FIG. 6, process 600 includes receiving updates to a flight plan from a first GCS (602), synchronizing the updates with a flight plan stored on the UAV (604), receiving a request from a second ground control station to control the UAV (606), authenticating the second GCS (608) and sending the updated flight plan to the second GCS (610). In an embodiment, the UAV controls the handoff process including authentication and synchronization of flight plans. For example, there may have been updated to the flight plan while the UAV was under control of the first GCS. Those updates can be synchronized with the flight plan stored on the UAV. After successful authentication of the second GCS, the updates to the flight plan can be synchronized with a flight plan stored by the GCS or the entire updated flight plan can be sent by the UAV to the second GCS. In an embodiment, the flight plan can be digitally signed to protect its contents.

Figure 7:
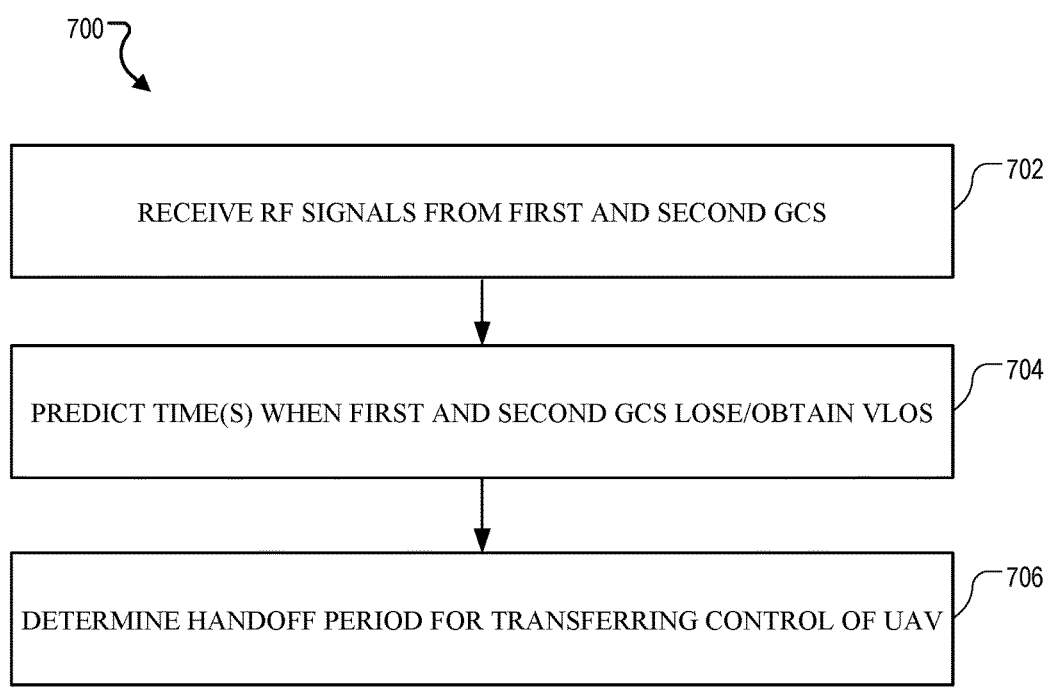

Referring to FIG. 7, process 700 includes receiving RF signals from a first GCS and second GCS (702), predicting time(s) when the first GCS and second GCS lose or obtain visual line of sight (704) and determining a handoff period for transferring control of the UAV from the first GCS to the second GCS based on the predicted time(s) (706). Because the flight plan and the flight path can change for a variety of reasons during a mission, in an embodiment the UAV can predict when in the future a handoff period should start. The UAV can perform the prediction using equations of motion, UAV flight parameters (e.g., position, airspeed, altitude), and the respective locations of the first GCS and second GCS. The respective locations of the first GCS and second GCS can be determined by GNSS receivers co-located with the first GCS and second GCS and transmitted to the UAV. Alternatively, the prediction can be performed by one or both of the first GCS and the second GCS or by each GCS and the UAV. The prediction can use a 3D terrain model to determine if any physical structures along the predicted flight path will block the visual line of sight of the first GCS or the second GCS to the UAV. In an embodiment, RF signal characteristics can be modeled in addition to geometry. The prediction result provides a time in the future where a handoff period can start and potentially complete successfully. FPS 200 of the UAV can then be programmed to initiate a handoff at the predicted start of the handoff period.

Figure 8:
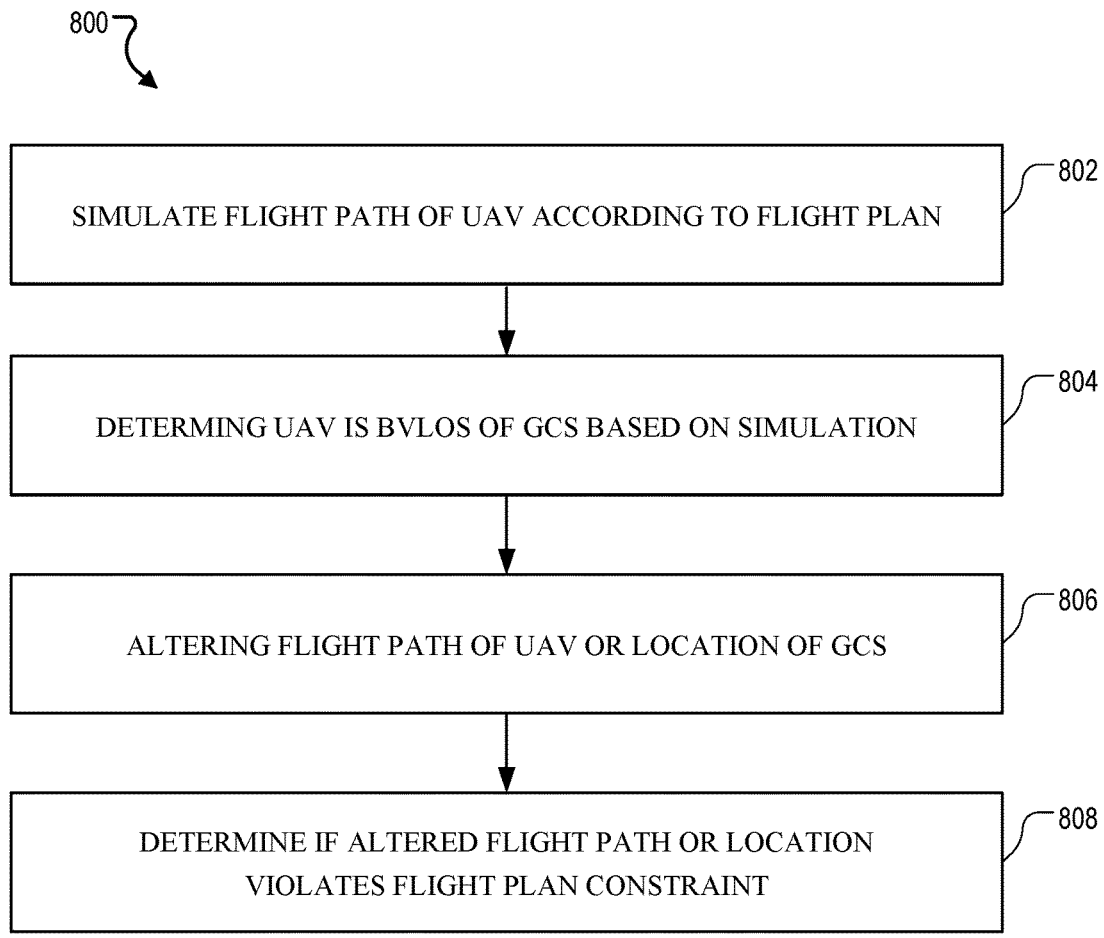

Referring to FIG. 8, process 800 includes simulating a flight path of a UAV according to a flight plan (802), determining if the UAV is beyond visual line of sight of a GCS based on the simulation (804), altering the flight path of the UAV or location of the GCS (806) and determining if the altered flight path or location violates a flight plan constraint (808). In an embodiment, if the altered flight path or GCS location does not violate a flight plan constraint (e.g., an altitude, geofence boundary or mission objective), then the flight plan can be automatically updated on the UAV.

In an embodiment, FPS 200 on UAV 401 (or a flight simulator at a ground-based location) can simulate a flight path of UAV 401 according to a flight plan and determine, based on the flight plan, if UAV 401 will be beyond visual line of sight of GCS 402 or GCS 403 at any time during a mission described by the flight plan. FPS 200 or flight simulator can then alter the flight plan to ensure that UAV is always within visual line of sight of at least one of GCS 402 and GCS 403 throughout a mission and both GCS 402 and GCS 403 during a handoff period. If a constraint in the original flight plan is not violated by the altered flight plan (e.g., an altitude limit violated), the altered flight plan can be used by UAV 401 in place of the original flight plan.

The processes and operations are described above in terms of one or more processors. The processor or processors can be onboard a UAV, onboard a user device, or part of a cloud-based processing system. In particular, a user device can be designated as a GCS and perform functions of a GCS. A user device and a UAV computer system can be designated as a FPS and perform functions of an FPS. Likewise, functions of both the GCS and FPS can be performed by a cloud-based processing system.

While the above discussion focuses primarily on a single user device or GCS for determining a visual line of sight interruption, multiple user devices or GCS devices that may communicate with the UAV can be used to determine a beyond visual line of sight occurrence. For example, a primary operator can control the UAV with a GCS, and one or more additional devices that are in communication with the UAV (or directly with the GCS) can cooperatively operate to determine if the UAV is beyond visual line of sight of each or all of the devices. So long as the UAV is determined to be within visual line of sight of at least one of the devices using the techniques described herein, then a contingency event would not be generated. For example, the UAV could receive a base location from a primary operator's GCS and a spotter's user device. The primary operator could be positioned at a location where the operator's GCS may lose visual line of sight of the UAV. However, the spotter's user device may also provide a base location to the UAV, or transmit the base location to the operator's GCS. If the visual line of sight between UAV's in-flight geo-spatial location and at least one of the devices (e.g., the user device or GCS), the UAV would be considered to be within visual line of sight, and no contingency operation would be initiated. However, if the UAV's visual line of sight for both the operator's GCS and the user device is interrupted, then a contingency operation would be conducted as described herein.

Various types of UAVs may be used to implement the inventions described herein (for example, a fixed wing airplane, helicopter, a multi-rotor vehicle (e.g., a quadcopter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smartphone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a toolbar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital videodisc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood within the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. An unmanned aerial vehicle (UAV) system comprising:
one or more processors; and
a memory storing instructions that, when executed by the one or more processors, cause the one or more processors to:
monitor a first radio frequency (RF) signal transmitted by a first ground control station and a second RF signal transmitted by a second ground control station authenticated by the UAV while the UAV navigates under the control of the first ground control station;
responsive to a determination that the UAV has navigated beyond a visual line of sight of the first ground control station, determine a handoff period for transferring control of the UAV from the first ground control station to the second ground control station based on the first RF signal and the second RF signal;
during the handoff period, initiate transfer of control of the UAV from the first ground control station to the second ground control station; and
after control of the UAV is transferred from the first ground control station to the second ground control station, navigate the UAV under the control of the second ground control station.

2. The system of claim 1, wherein, to determine the handoff period, the instructions, when executed by the one or more processors, cause the one or more processors to:
initiate, by the UAV, the handoff period based on one or more of the following: a change in a characteristic of the first RF signal, a threshold distance of the location of the UAV from the location of the first ground control station, or when the UAV arrives at a predetermined location or area.

3. The system of claim 1, wherein the instructions, when executed by the one or more processors, cause the one or more processors to:
receive by the UAV, from the first ground control station, a flight plan to be conducted via an auto-pilot mode by the UAV;
navigate the UAV according to the flight plan received from the first ground control station; and
after control is transferred to the second ground control station, continue navigation of the UAV according to the flight plan under control of the second ground control station.

4. The system of claim 3, wherein the instructions, when executed by the one or more processors, cause the one or more processors to:
receive, by the UAV from the first ground control station an updated flight plan; and
transmit the updated flight plan from the UAV to the second ground control station.

5. The system of claim 1, wherein, to initiate the transfer of control, the instructions, when executed by the one or more processors, cause the one or more processors to:
receive, by the UAV, an acceptance or confirmation from the second ground control station to take over control of the UAV;
receive, by the UAV, an approval or confirmation from the first ground control station to release control from the first ground control station;
enable control of the UAV by the second ground control station; and
release control of the UAV from the first ground control station.

6. The system of claim 1, wherein the instructions, when executed by the one or more processors, cause the one or more processors to:
authenticate, by the UAV, that the second ground control station is authorized or pre-registered to take over control of the UAV.

7. The system of claim 1, wherein the instructions, when executed by the one or more processors, cause the one or more processors to:
during the handoff period, conduct a holding pattern by the UAV until transfer of operative control from the first ground control station to the second ground control station has been completed.

8. The system of claim 1, wherein the instructions, when executed by the one or more processors, cause the one or more processors to:
during the handoff period, determine, by the UAV, that a number of attempts to communicate with the second ground control station have failed;
determine a new flight path or altitude for the UAV;
determine, by the UAV, that the new flight path or altitude does not violate a flight plan constraint; and
generate, by the UAV, one or more commands to maneuver the UAV to the new flight path or altitude.

9. The system of claim 1, wherein, to navigate the UAV under the control of the first ground control station, the instructions, when executed by the one or more processors, cause the one or more processors to receive and execute, by the UAV, flight commands from the first ground control station, and
wherein, to navigate the UAV under the control of the second ground control station, the instructions, when executed by the one or more processors, cause the one or more processors to receive and execute, by the UAV, flight commands from the second ground control station.

10. The system of claim 1, wherein the instructions, when executed by the one or more processors, cause the one or more processors to:
receive, by the UAV, first messages or data from the first ground control station and transmitting the received first messages to the second ground control station; and
receive, by the UAV, second messages or data from the second ground control station and transmitting the received second messages or data to the first ground control station.

11. A non-transitory computer storage medium storing instructions, that when executed by an unmanned aerial vehicle (UAV) comprising one or more processors, cause the UAV to perform operations comprising:
monitoring a first radio frequency (RF) signal transmitted by a first ground control station and a second RF signal transmitted by a second ground control station while the UAV navigates under the control of the first ground control station;
responsive to determining that the UAV has navigated beyond a visual line of sight of the first ground control station, determining a handoff period for transferring control of the UAV from the first ground control station to a second ground control station based on the first RF signal and the second RF signal;
during the handoff period, initiating, transfer of control of the UAV from the first ground control station to the second ground control station; and after transferring control of the UAV from the first ground control station to the second ground control station, navigating the UAV under the control of the second ground control station.

12. The non-transitory computer storage medium of claim 11, wherein determining the handoff period comprises:
   initiating, by the UAV, the handoff period based on one or more of the following: a change in a characteristic of the first RF signal, a threshold distance of the location of the UAV from the location of the first ground control station, or when the UAV arrives at a predetermined location or area.

13. The non-transitory computer storage medium of claim 11, the operations further comprising:
   receiving by the UAV, from the first ground control station, a flight plan to be conducted via an auto-pilot mode by the UAV;
   navigating the UAV according to the flight plan received from the first ground control station; and
   after transferring control to the second ground control station, continuing navigation of the UAV according to the flight plan under control of the second ground control station.

14. The non-transitory computer storage medium of claim 13, the operations further comprising:
   receiving, by the UAV from the first ground control station an updated flight plan; and transmitting the updated flight plan from the UAV to the second ground control station.

15. The non-transitory computer storage medium of claim 11, wherein the initiating, by the UAV, transfer of control comprises:
   receiving, by the UAV, an acceptance or confirmation from the second ground control station to take over control of the UAV;
   receiving, by the UAV, an approval or confirmation from the first ground control station to release control from the first ground control station;
   enabling control of the UAV by the second ground control station; and
   releasing control of the UAV from the first ground control station.

16. The non-transitory computer storage medium of claim 11, the operations further comprising:
   authenticating, by the UAV, that the second control station is authorized or pre-registered to take over control of the UAV.

17. The non-transitory computer storage medium of claim 11, the operations further comprising:
   during the handoff period, conducting a holding pattern by the UAV until transfer of operative control from the first ground control station to the second ground control station has been completed.

18. The non-transitory computer storage medium of claim 11, the operations further comprising:
   during the handoff period, determining, by the UAV, that a number of attempts to communicate with the second ground control station have failed;
   determining, a new flight path or altitude for the UAV;
   determining, by the UAV, that the new flight path or altitude does not violate a flight plan constraint; and
   generating, by the UAV, one or more commands to maneuver the UAV to the new flight path or altitude.

19. The non-transitory computer storage medium of claim 11, wherein navigating the UAV under the control of the first ground control station comprises receiving and executing, by the UAV, flight commands from the first ground control station; and wherein navigating the UAV under the control of the second ground control station comprises receiving and executing, by the UAV, flight commands from the second ground control station.

20. The non-transitory computer storage medium of claim 11, the operations further comprising:
   receiving, by the UAV, first messages or data from the first ground control station and transmitting the received first messages to the second ground control station; and
   receiving, by the UAV, second messages or data from the second ground control station and transmitting the received second messages or data to the first ground control station.

21. A method comprising:
   monitoring a first radio frequency (RF) signal transmitted by a first ground control station and a second RF signal transmitted by a second ground control station while the UAV navigates under the control of the first ground control station;
   responsive to determining that the UAV has navigated beyond a visual line of sight, determining a handoff period for transferring control of the UAV from the first ground control station to the second ground control station based on the first RF signal and the second RF signal;
   during the handoff period, initiating transfer of control of the UAV from the first ground control station to the second ground control station; and
   after transferring control of the UAV from the first ground control station to the second ground control station, navigating the UAV under the control of the second ground control station.

22. The method of claim 21, wherein determining the handoff period comprises:
   initiating, by the UAV, the handoff period based on one or more of the following: a change in a characteristic of the first RF signal, a threshold distance of the location of the UAV from the location of the first ground control station, or when the UAV arrives at a predetermined location or area.

23. The method of claim 21, further comprising:
   receiving by the UAV, from the first ground control station, a flight plan to be conducted via an auto-pilot mode by the UAV;
   navigating the UAV according to the flight plan received from the first ground control station; and
   after transferring control to the second ground control station, continuing navigation of the UAV according to the flight plan under control of the second ground control station.

24. The method of claim 23, further comprising:
   receiving, by the UAV from the first ground control station an updated flight plan; and
   transmitting the updated flight plan from the UAV to the second ground control station.

25. The method of claim 21, wherein the initiating, by the UAV, transfer of control comprises:
   receiving, by the UAV, an acceptance or confirmation from the second ground control station to take over control of the UAV;
   receiving, by the UAV, an approval or confirmation from the first ground control station to release control from the first ground control station;
   enabling control of the UAV by the second ground control station; and
   releasing control of the UAV from the first ground control station.

26. The method of claim 21, further comprising:
authenticating, by the UAV, that the second ground control station is authorized or pre-registered to take over control of the UAV.

27. The method of claim 21, further comprising:
during the handoff period, conducting a holding pattern by the UAV until transfer of operative control from the first ground control station to the second ground control station has been completed.

28. The method of claim 21, further comprising:
during the handoff period, determining, by the UAV, that a number of attempts to communicate with the second ground control station have failed;
determining, a new flight path or altitude for the UAV;
determining, by the UAV, that the new flight path or altitude does not violate a flight plan constraint; and
generating, by the UAV, one or more commands to maneuver the UAV to the new flight path or altitude.

29. The method of claim 21, wherein navigating the UAV under the control of the first ground control station comprises receiving and executing, by the UAV, flight commands from the first ground control station; and wherein navigating the UAV under the control of the second ground control station comprises receiving and executing, by the UAV, flight commands from the second ground control station.

30. The method of claim 21, further comprising:
receiving, by the UAV, first messages or data from the first ground control station and transmitting the received first messages or data to the second ground control station; and
receiving, by the UAV, second messages or data from the second ground control station and transmitting the received second messages or data to the first ground control station.

* * * * *